J. BLACKWOOD.
TEETH FASTENINGS FOR HORSE RAKES.

No. 175,413.  Patented March 28, 1876.

Witnesses
W. H. Clarke
B. Pickering

Inventor
John Blackwood.

UNITED STATES PATENT OFFICE.

JOHN BLACKWOOD, OF DAYTON, OHIO, ASSIGNOR OF ONE-HALF HIS RIGHT TO BENJAMIN C. TAYLOR, OF SAME PLACE.

IMPROVEMENT IN TEETH-FASTENINGS FOR HORSE-RAKES.

Specification forming part of Letters Patent No. 175,413, dated March 28, 1876, application filed December 21, 1874.

*To all whom it may concern:*

Be it known that I, JOHN BLACKWOOD, of Dayton, in the county of Montgomery and State of Ohio, have invented a new and useful Improvement in Horse Hay-Rakes; and I do hereby declare the following to be a full, clear, and exact description of the same, reference being had to the accompanying drawings, forming part of this specification, in which—

Figure 1:
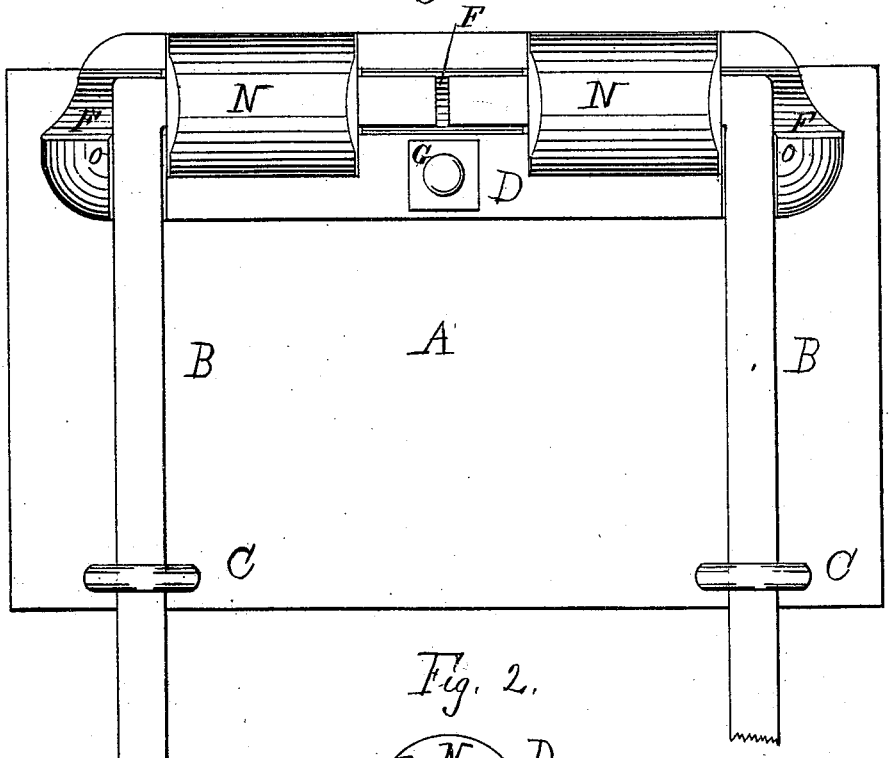
Figure 2:
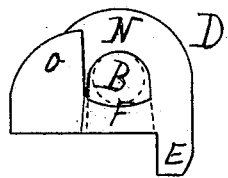

Figure 1 is a plan view, showing my improved means for attaching the rake-teeth to the rake-axle, or to a bar connected therewith; and Fig. 2 is an end elevation of the fastening device detached from the rake-axle.

Similar letters of reference in the accompanying drawings denote the same parts.

My invention has for its object to improve the means for hinging the teeth of horse hay-rakes to the rake head or axle; and to this end it consists in a fastening device of peculiar construction secured to the top of the head or axle by a single bolt, and adapted to receive two instead of a single tooth, as I will now proceed to describe.

In the accompanying drawings, D is the fastening device, cast with a long base-plate to fit down upon the top of the rake head or axle A, and with a lip, E, at its front edge to fit down over the front edge of the rake-head, as shown in Fig. 2. The base-plate is further cast with a longitudinal channel, F, extending its entire length, and arched over at two points, equidistant from the middle of the plate, by the rounded bosses N N. The bosses are also channeled, and, together with the channeled base-plate, form the sockets for the bent ends of the two rake-teeth B. The inner corners of the base-plate in front of the channel form projections o o, to retain the teeth in place within the bosses. The casting is secured to the rake-head by a single vertical bolt, G, passing through the middle of the base-plate in front of the channel, as shown in Fig. 1. To attach the teeth to the fastening they are first raised to a vertical position, and the ends inserted in the bosses N. They are then lowered upon the base-plate between the bosses and projections o, as shown in Fig. 1, staples or guides C being afterward placed over them at the rear edge of the axle, to permit the requisite amount of vertical play, and at the same time prevent them from being casually thrown upward to clear the projections o, and thereby becoming detached from the fastening.

The channels in the base-plate outside the bosses serve to guide the bent ends of the rake-teeth while being inserted in the bosses, and therefore greatly facilitate the application of the teeth. Without these guides the teeth would have to be held upright, and guided by hand into the boss or bosses, and as they are long, and therefore rather unwieldly, their application would be difficult, and require the exercise of considerable care and judgment. With the guides, however, little care is required, as they support the weight of the teeth, and direct their ends into the bosses.

By constructing the fastening, as above described, two rake-teeth instead of one are articulated upon the axle by a single bolt, and consequently the axle is not weakened as it would be if a bolt were used for the fastening of each tooth. The bolts, moreover, pass vertically through the axle, and the leverage of the teeth, when in operation, does not, therefore, tend to split or crack the wood. The bolt holds the fastening firmly down upon the axle, and the lip E, by bearing against the front of the latter, prevents the fastening from turning on the bolt.

I am aware that fastenings for a single tooth have heretofore been made in the form of a single plate bolted to the front of the axle or rake-head, and constructed upon its upper edge with an eye or boss to receive the bent end of the tooth, and a stud to prevent it from slipping out of the eye. This construction I do not claim, my invention being designed to remedy its defects, which, briefly stated, are as follows, to wit: first, the liability of the plates turning sidewise upon their bolts, thus cramping the teeth, and preventing their free articulation; secondly, the weakening of the axle or rake-head by the increased number of bolts employed; thirdly, the danger of splitting the weakened axle by the leverage of the teeth upon the horizontal bolts; and, fourthly, the want of guides for supporting and directing the teeth into the bosses.

Having thus described my invention, I claim as new—

1. The fastening for the teeth of horse hay-rakes, consisting of the channeled base-plate D, the lip E at the front edge thereof, the bosses N N, to receive two rake-teeth, and the projections o o, to prevent the teeth from slipping out of the bosses, all cast in one piece, and secured to the top of the axle or rake-head by a single bolt, G, substantially as described, for the purposes specified.

2. The compound tooth-fastening device, constructed, as described, with the guide-channels outside the bosses N N, substantially as described, for the purposes specified.

JOHN BLACKWOOD.

Witnesses:
W. H. CLARK,
B. PICKERING.